(12) United States Patent
Pitsch et al.

(10) Patent No.: US 8,231,318 B2
(45) Date of Patent: Jul. 31, 2012

(54) PUSH AND TURN NUT FOR QUICK FAUCET INSTALLATION

(75) Inventors: Walter Pitsch, Washington, NJ (US); Marin Cvyatkov Marinov, East Brunswick, NJ (US)

(73) Assignee: AS IP Holdco, L.L.C., Piscataway, NJ (US)

( * ) Notice: Subject to any disclaimer, the term of this patent is extended or adjusted under 35 U.S.C. 154(b) by 52 days.

(21) Appl. No.: 12/705,480

(22) Filed: Feb. 12, 2010

(65) Prior Publication Data

US 2010/0272503 A1    Oct. 28, 2010

Related U.S. Application Data

(60) Provisional application No. 61/171,762, filed on Apr. 22, 2009.

(51) Int. Cl.
*F16B 39/36* (2006.01)
(52) U.S. Cl. .......................... 411/270; 411/433
(58) Field of Classification Search .............. 411/270, 411/432–434; 285/4
See application file for complete search history.

(56) References Cited

U.S. PATENT DOCUMENTS

| | | | | |
|---|---|---|---|---|
| 1,475,907 | A | * | 11/1923 | Volman .......................... 411/433 |
| 3,599,260 | A | | 8/1971 | Lesh |
| 3,695,139 | A | | 10/1972 | Howe |
| 4,281,857 | A | | 8/1981 | Randall |
| 4,659,273 | A | * | 4/1987 | Dudley .......................... 411/373 |
| 4,889,368 | A | | 12/1989 | Laipply |
| 4,890,964 | A | * | 1/1990 | Lindley et al. ................ 411/270 |
| 5,027,671 | A | * | 7/1991 | Erikson et al. ................... 74/441 |
| 5,100,275 | A | | 3/1992 | Schirrmacher |
| 5,141,372 | A | | 8/1992 | Donner |

(Continued)

FOREIGN PATENT DOCUMENTS

JP    08246521 A2    9/1996

(Continued)

OTHER PUBLICATIONS

PCT International Search Report for International Application No. PCT/US2010/031168, dated Jun. 16, 2010.

*Primary Examiner* — Gary Estremsky
(74) *Attorney, Agent, or Firm* — Flaster/Greenberg P.C.

(57) ABSTRACT

A nut and an assembly including such a nut are described herein, wherein the nut includes an outer shell having an outer surface, an inner circumferential surface having a inwardly extending flange, and an upper rim portion; and an insert piece having an upper outwardly extending portion and a plurality of downwardly extending projections, wherein each of the projections has an outer surface and an inner surface, a portion of the inner surfaces of the projections is configured to engage a nut-receiving surface and the outer portion of the projections is configured to engage the inner circumferential surface of the first outer shell such that upon a pushing action of a user the inwardly extending flange on the outer shell presses upwardly on the upper outwardly extending portion of the insert piece so that the portion of the inner surfaces of the projections configured to receive a nut-receiving surface moves outwardly and upon removal of the pushing action, portion of the inner surfaces of the projections configured to receive a nut-receiving surface moves inwardly.

33 Claims, 12 Drawing Sheets

U.S. PATENT DOCUMENTS

| | | | |
|---|---|---|---|
| 5,822,811 A * | 10/1998 | Ko | 4/678 |
| 5,944,467 A * | 8/1999 | Yuta | 411/433 |
| 5,946,746 A | 9/1999 | Bloom | |
| 6,240,798 B1 * | 6/2001 | Erikson et al. | 74/424.81 |
| 6,361,260 B1 | 3/2002 | Schirrmacher | |
| 6,497,433 B1 | 12/2002 | Ketcham | |
| 6,678,903 B1 | 1/2004 | Rhodes | |
| 7,003,818 B2 | 2/2006 | McNerney et al. | |
| 7,174,581 B2 | 2/2007 | McNerney et al. | |
| 7,179,038 B2 * | 2/2007 | Reindl | 411/433 |
| 7,273,070 B2 | 9/2007 | Lin | |
| 7,338,242 B2 * | 3/2008 | Ellis et al. | 411/260 |
| 2006/0101576 A1 | 5/2006 | Rhodes | |

FOREIGN PATENT DOCUMENTS

JP    11200437  A2    7/1999

* cited by examiner

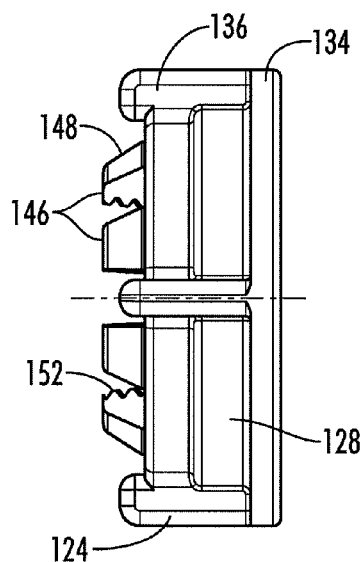 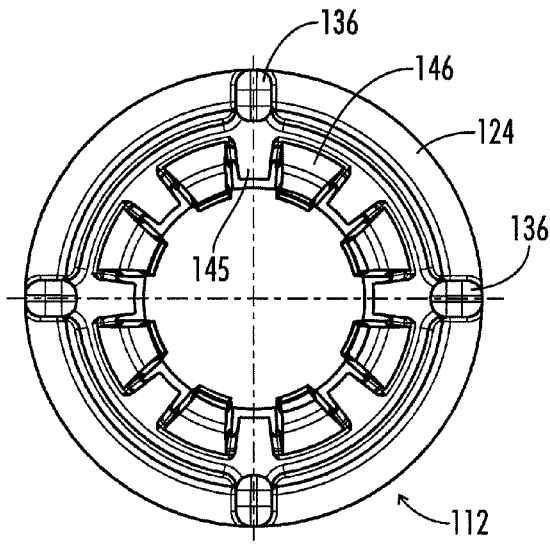 
FIG. 12    FIG. 13
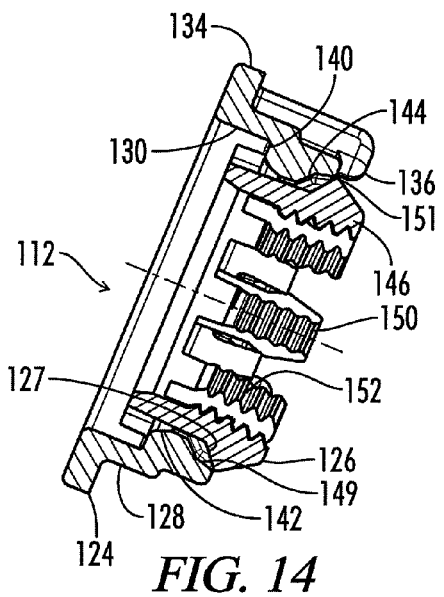 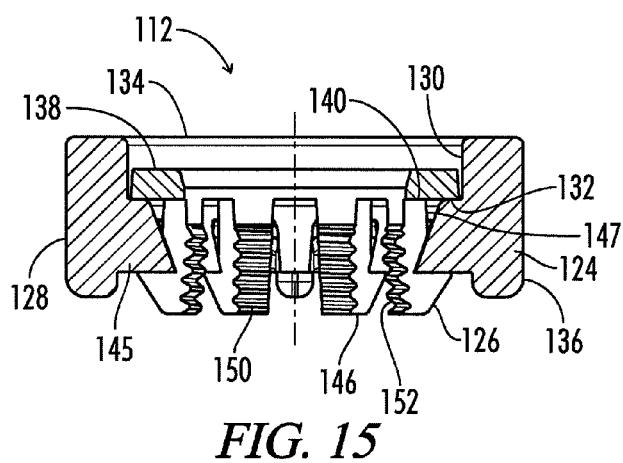
FIG. 14    FIG. 15

PUSH AND TURN NUT FOR QUICK FAUCET INSTALLATION

CROSS-REFERENCE TO RELATED APPLICATIONS

This application claims the benefit, under 35 U.S.C. §119 (e) of U.S. provisional patent application No. 61/171,762, filed Apr. 22, 2009, the entire disclosure of which is incorporated herein by reference.

BACKGROUND OF THE INVENTION

1. Field of the Invention

The invention involves a push and turn nut that may have various applications, particularly for the quick installation of a faucet assembly on a sink or counter.

2. Description of Related Art

Push and turn nuts of different designs are known in the art. For example, U.S. Pat. No. 7,338,242 includes a fastener assembly with a washer element and a nut element, wherein the latter is split and has a screw thread that threadably engages a bolt, such as for construction and other uses. U.S. Pat. No. 6,351,260 discusses a push and turn fastener for use on a bolt. Insert segments are placed within a central bore, and each segment has an inwardly facing threaded portion and outward projection. The inner segment has a front beveled edge to slide into the bore in a corresponding portion. The outwardly extending portion cooperates with a ledge to limit movement of the insert. An end cap retains the segments in the housing. The inside segments are displaced in the housing to accommodate longitudinal movement of a bolt through the housing for quick installation.

Such push and turn nuts in varying designs have also been adopted in the plumbing area. U.S. Pat. No. 4,281,857 of Randall describes a faucet connector with a nut assembly having a pair of individual sections with a bore that receive a pipe-like member. A pair of strap-like members surrounds the nut as a retaining device to keep the nut sections in surrounding relation to the faucet tailpiece. The nut sections are free to move radially toward and away from each other and so can be brought into and out of contact with the threaded tailpiece. Levers pivotally connect the retaining device and operate to contact the nut sections and urge them to and away from the tailpiece by the pivot motion.

U.S. Patent Publication No. 2006/0101576 A1 of Rhodes includes a mounting nut for a water connection fitting that is hinged for sliding over the fitting and up against the bottom-mounting surface of a sink to secure a faucet to a sink deck. Pushing the nut against the deck causes the sides of the nut to compress against the threaded water pipe.

While such designs exist, there is a need in the art for a design which allows the installer to push the nut as far along the threads as possible with as little spin as possible, tightening only at the end of the threaded bolt (in the case of a faucet the threaded tailpiece). It is also important that sufficient torque can be transmitted to the nut when threading upon proper location on the bolt or threaded tailpiece. It would also be advantageous to have such a nut which has a minimal number of working pieces, is easy to make and install, particularly within small and awkward locations, such as under a sink deck where faucet assemblies and other plumbing fixtures are installed or in other areas where nut and bolt installation is physically challenging to the user.

BRIEF SUMMARY OF THE INVENTION

The invention includes a nut which comprises an outer shell having an outer surface, an inner circumferential surface having a inwardly extending flange, and an upper rim portion; and an insert piece having an upper, outwardly extending portion and a plurality of downwardly extending projections, wherein each of the projections has an outer surface and an inner surface, wherein a portion of the inner surfaces of each of the projections is configured to allow the nut to engage a nut-receiving surface and the outer surfaces of the projections are configured to engage the inner circumferential surface of the first outer shell such that upon a pushing action of a user, the inwardly extending flange of the outer shell presses upwardly on the upper, outwardly extending portion of the insert piece so that the portion of each of the inner surfaces of the projections configured to engage a nut-receiving surface move outwardly and upon removal of the pushing action, the portion of the inner surfaces of each of the projections configured to engage a nut-receiving surface move back inwardly.

In the nut, the upper outwardly extending portion of the insert piece may be an upper rim flange, can be configured as a plurality of extensions or another configuration. If the outwardly extending portion of the insert piece is a plurality of extensions, each may be formed so as to have a rounded outer peripheral cross-sectional configuration. The portion of the inner surfaces of each of the projections on the insert piece configured to allow the nut to engage a nut-receiving surface may be formed so as to have threads for mating engagement on a threaded nut-receiving surface. If so, each of the threads may be symmetrical, form an angle of about 30 degrees with a transverse axis through the thread. The outer shell may further optionally comprise at least one pair of opposed ribs extending longitudinally downwardly from the rim portion. The outer shell and the insert piece may be of one unitary design or two separate interlocking pieces. The inner circumferential surface of the outer shell of the nut may comprise an outwardly sloped generally conical surface that engages a mating conical sloped surface on the outer surface of the projections when the nut is engaged against a nut-receiving surface. Further, in preferred embodiments, the inner circumferential surface of the outer shell may further comprise a chamfered portion.

The outer shell and/or the insert piece may be formed of a material that comprises a polymeric material such as a thermoplastic moldable material. The outer shell and/or the insert piece comprise a metal or a metal alloy.

The invention also includes an assembly, that comprises: an apparatus having a nut receiving surface, and a nut, comprising an outer shell having an outer surface, an inner circumferential surface having an inwardly extending flange, and an upper rim portion; and an insert piece having an upper outwardly extending portion and a plurality of downwardly extending projections, wherein each of the projections has an outer surface and an inner surface, wherein a portion of the inner surfaces of each of the projections is configured to allow the nut to engage the nut-receiving surface of the apparatus, and the outer surfaces of the projections are configured to engage the inner circumferential surface of the first outer shell such that upon a pushing action of a user, the inwardly extending flange on the outer shell presses upwardly on the upper, outwardly extending portion of the insert piece so that the portion of the inner surfaces of each of the projections configured to engage the nut-receiving surface move outwardly and upon removal of the pushing action, the portion of each of the inner surfaces of the projections configured to engage the nut-receiving surface move back inwardly so as to engage the nut-receiving surface on the apparatus.

The assembly may be a faucet assembly, in which case the apparatus may be a faucet. In the case of a faucet, the faucet may comprise a base and at least one tailpiece, wherein the nut-receiving surface is on the tailpiece. The tailpiece may be configured to extend downwardly below a deck of a sink on installation and the nut-receiving surface is a threaded exterior surface of the tailpiece. If the apparatus is a faucet, the faucet may be a kitchen faucet, a bathroom faucet, or the like. The apparatus may also be a sprayer for lavatory fittings, a side spray or other similar apparatus that may benefit from use of a quick turn nut. Any faucet-related fixture that is deck-mounted or requires a mounting surface can also be used. In a faucet assembly, a tailpiece may comprise copper, brass, lead or alloys thereof.

In the nut of the assembly noted above, the upper outwardly extending portion of the insert piece may be an upper rim flange or be configured to comprise a plurality of extensions or another similar configuration. If a plurality of extensions is employed, the plurality of extensions may have a rounded outer peripheral cross-sectional configuration. The portion of each of the inner surfaces of the projections on the insert piece which is configured to allow the nut to engage the nut-receiving surface may be made so as to have threads, and the nut-receiving surface thus have mating threads for mating engagement with the portion of the inner surfaces of the projections of the insert piece. If threads are employed, the threads on the nut may be symmetrical. Each of the threads on the nut may forms an angle of about 30 degrees with a transverse axis through the thread. The outer shell may further comprise at least one pair of opposed ribs extending longitudinally downwardly from the rim portion. The outer shell and the insert piece may be unitarily formed or made as two separate interlocking pieces. The inner circumferential surface of the outer shell of the nut may comprise an outwardly sloped generally conical surface that engages a mating conical sloped surface on the outer surface of the projections when the nut is engaged against a nut-receiving surface. Further, in preferred embodiments, the inner circumferential surface of the outer shell may further comprise a chamfered portion. The outer shell and/or the insert piece may comprise a polymeric material, such as a thermoplastic moldable material. The outer shell and/or the insert piece may also comprise a metal or a metal alloy.

BRIEF DESCRIPTION OF THE SEVERAL VIEWS OF THE DRAWING(S)

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 12 is a side elevational view of the nut of FIG. 11;

FIG. 13 is a bottom plan view of the nut of FIG. 11;

FIG. 14 is a longitudinal cross-sectional view of the nut of FIG. 11 taken along line 14-14;

FIG. 15 is a longitudinal cross-sectional view of the nut of FIG. 11 taken along line 15-15;

DETAILED DESCRIPTION OF THE INVENTION

Figure 1:
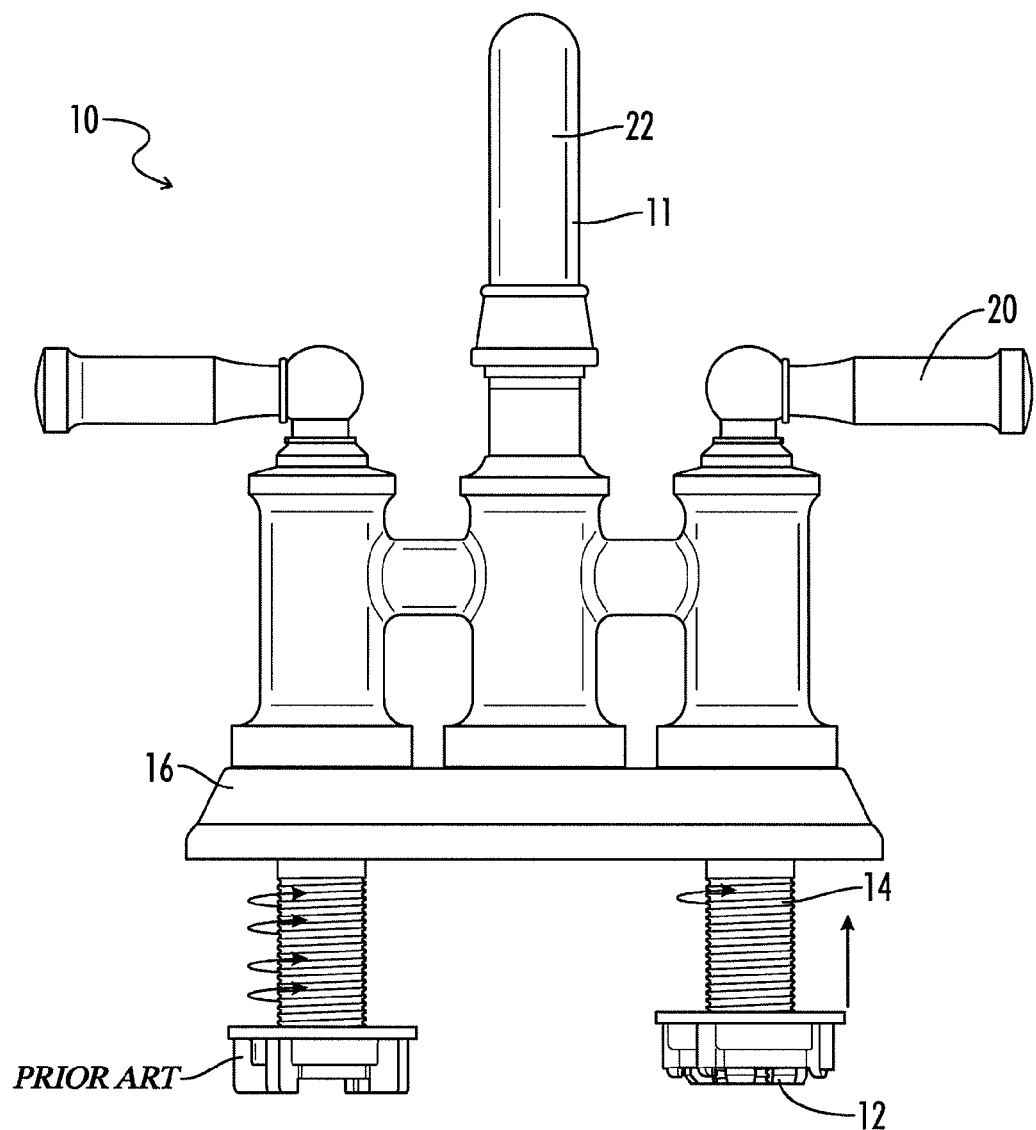
FIG. 1 is a front elevational view of a faucet assembly having a push and turn nut according to the invention on a lower end of a threaded faucet tailpiece and a conventional nut on the other tailpiece.

As used herein, words such as "inner" and "outer," "upper" and "lower," "interior" and "exterior," and "right" and "left" and words of similar import are intended to be used to understand the invention better in conjunction with the drawings attached hereto and to have their ordinary meaning when referring to directions in the drawings. They are not intended to be limiting. Likewise, the invention is described herein in preferred embodiments, for example, with respect to the assembly, a preferred use on a faucet is described, however, it will be understood from this disclosure that the nut of the invention may be used in a variety of uses requiring a nut on a nut-receiving surface such as a bolt, or other mating structure, such as a threaded mating structure, wherein the surface is configured so as to receive a nut as described herein. Such a nut-receiving surface will preferably have a generally round cross-section and generally cylindrical shape as is known in the art.

The nut of the invention provides the desired features noted in the background and fulfills a need in the art for such features. It is simple and cost effective, particularly since the components thereof can be formed or molded of a variety of materials, including polymeric materials such as moldable thermoplastic, metals or metal alloys, and can be of an easy-to-make and easy-to-use one- or two-piece configuration.

While easier to use, the nut appears from a standard view to look like a conventional nut so that consumers and users will have familiarity with the product, yet to operate easily by the user to avoid significant turning. To illustrate this advantage over a standard nut, reference is made to FIG. 1. In FIG. 1, on the left is a standard prior art inwardly threaded nut installed on the left side of an assembly, in this case a faucet assembly referred to herein as assembly 10, and as FIG. 1 shows will have to be turned in the direction of the arrows as many as approximately 25 times by a user installing the assembly 10 against a sink deck. On the right hand side of the drawing, a push and turn nut according to the invention, referred to herein as nut 12, is shown on the assembly 10. As illustrated by the arrows on the right side of the assembly 10, the nut 12 upon pushing slides upwardly over the tailpiece 14 until close to the top of the tailpiece and either from user action or by impacting the upper surface (presumably a sink deck), can be locked and then turned as illustrated by the turning arrow on the right side of FIG. 1 so that only a few turns, as few as one or two turns, secures the nut in place on the threaded tailpiece 14.

Figure 3:
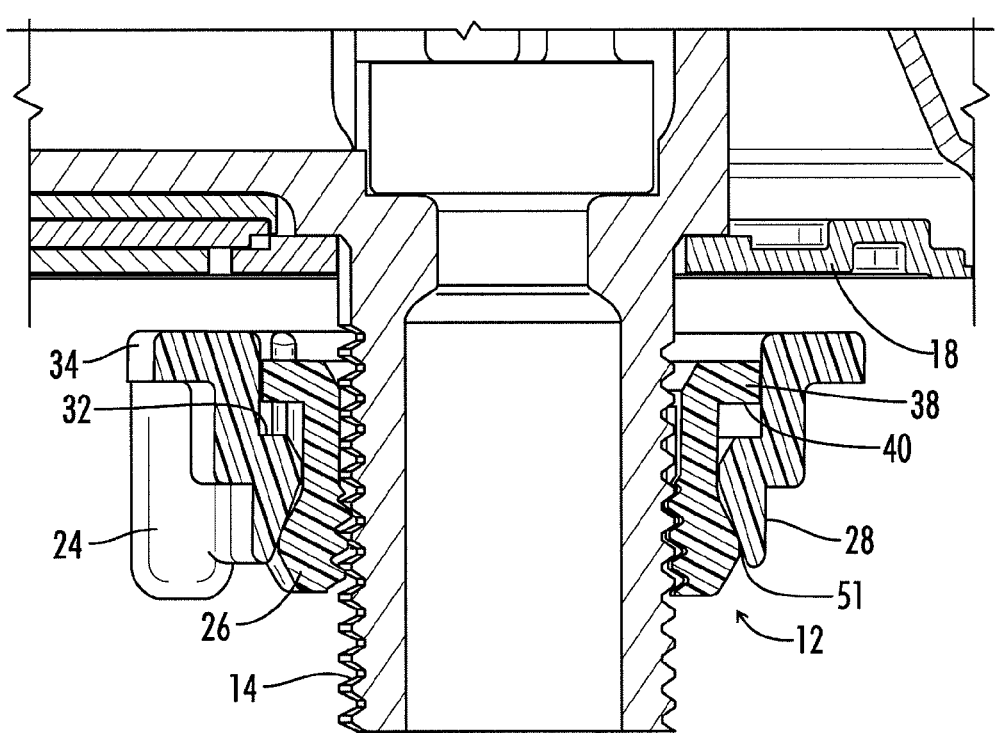
FIG. 3 is a longitudinal cross-sectional enlarged view of one of the push and turn nuts of FIG. 1 near the upper end of a threaded faucet tailpiece.

As shown in FIG. 1, in one embodiment of the invention, an assembly 10 having an apparatus 11 and a nut 12, is illustrated is a faucet assembly 10 wherein the apparatus 11 is a faucet, which assembly 10 is preferably provided so as to have one or two tailpieces 14 extending downwardly therefrom for assisting in installation of the faucet 11 so that its base 16 will seat against a sink deck 18 (see FIG. 3). The faucet 11 may have one or more handles 20 or other flow actuators and one or more flow delivery pieces such as spigot 22. As noted above, a faucet assembly is shown for illustrative purposes only, however, the nut of the invention can be used in a wide variety of applications and is not limited to typical center-set type faucet assemblies, including use in other faucet assemblies such as bath or kitchen faucets, sprayers, side sprays, spread lavatories, construction uses, other plumbing uses, hose connections, heating, ventilation and air conditioning applications and the like.

In the embodiment shown, the nut 12 includes two interlocking pieces which may be formed as one integral piece or, more preferably as two separate pieces that can be fitted within each other. The first piece is an outer shell 24 and the second is an insert piece 26. The outer shell has an outer surface 28, an inner circumferential surface 30 having a inwardly extending flange 32, an upper rim portion 34 and at least one pair of opposed ribs 36 extending longitudinally downwardly from the rim portion.

Figure 2:
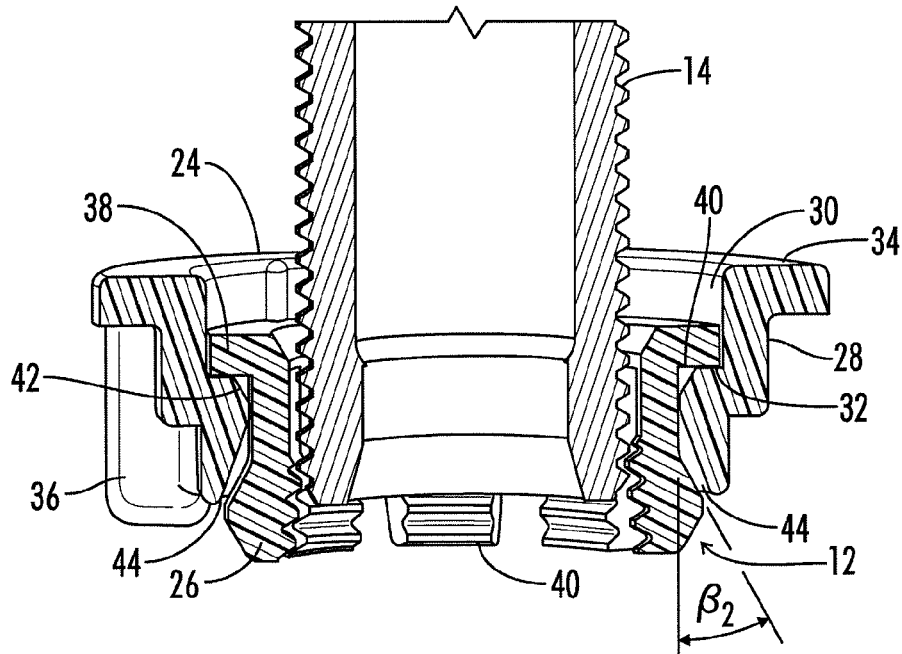
FIG. 2 is a longitudinal cross-sectional enlarged view of one of the push and turn nuts in FIG. 1 at the lower end of a threaded faucet tailpiece.
Figure 4:
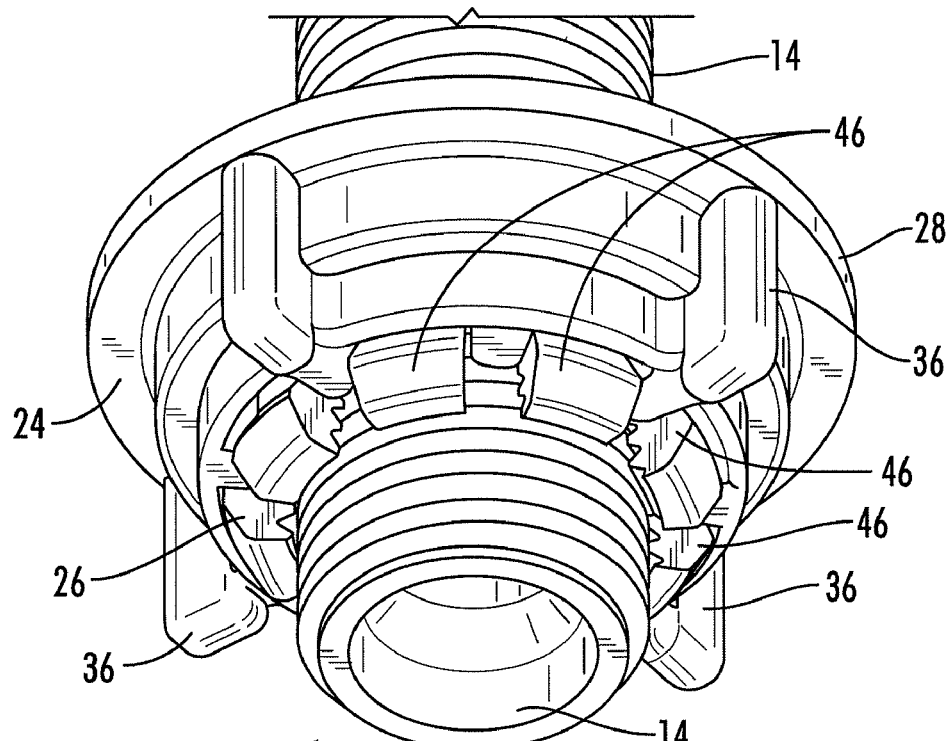
FIG. 4 is a perspective view of the push and turn nut of FIG. 1 with the inner threads of the nut expanded outwardly away from the threaded tailpiece.
Figure 5:
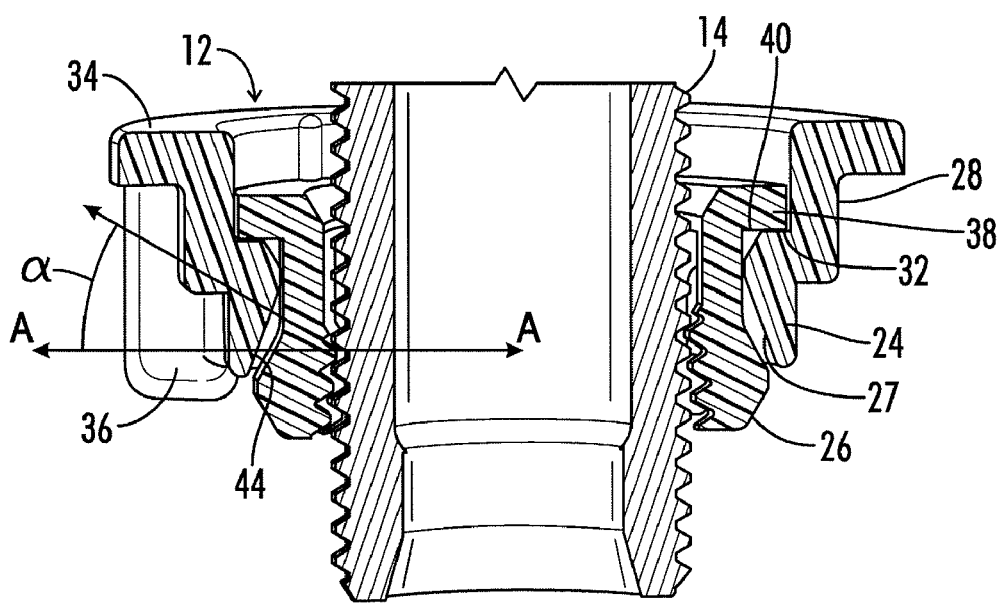
FIG. 5 is a longitudinal cross-sectional view of the nut with the inner threads engaged on the threads of the tailpiece.
Figure 6:
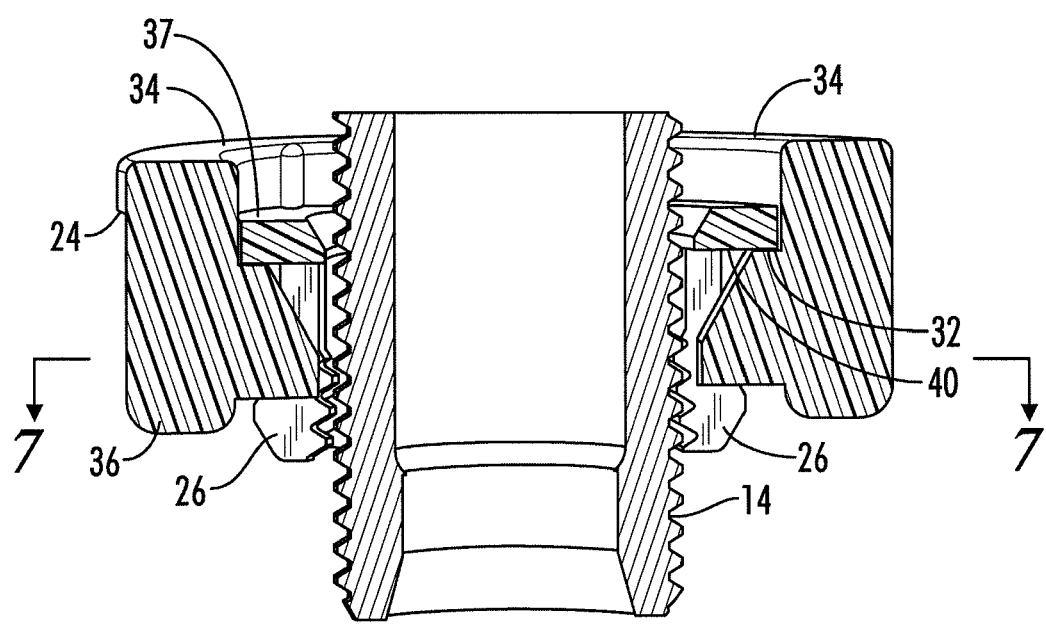
FIG. 6 is further longitudinal cross-sectional view of the nut with the inner threads engaged taken through the nut so as to show the cross-section of two opposed locking ribs.
Figure 7:
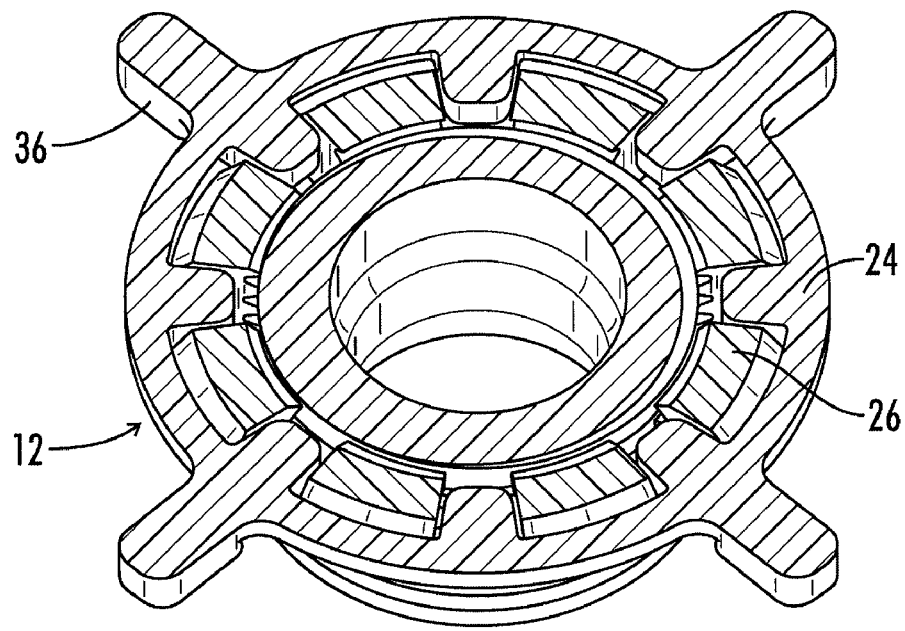
FIG. 7 is a lateral cross-sectional view of the nut of FIG. 6 taken along line 7-7.

The outer surface 28 is preferably formed for gripping, and may have indentations or other shapes to assist a user in gripping or may have a smooth surface. As best shown in FIG. 4, it is stepped down to provide for ease of pressing and gripping. With reference to FIGS. 2-6, the inner circumferential surface 30 is configured so as to engage the insert piece 26 as described herein. The surface 30 is preferably shaped so as to form the inwardly extending flange 32 having an upper surface which is generally flat and lies in a transverse plane. The flange 32 will engage an upper outwardly extending portion 37. In the presently illustrated embodiment, the upper outwardly extending portion 37 is shown as a rim flange 38 of the insert piece. However, other configurations can be formed. The outwardly extending portion 37 should be configured so as to interact with the inwardly extending flange of the outer shell so that the inner flange can move as described herein. In the present embodiment, a circumferential rim flange 38 is illustrated. When the two pieces (outer shell 28 and insert piece 26) engage, such as by a pushing upward in the longitudinal direction or by other sliding action of the user, the inwardly extending flange 32 of the outer shell will engage, in this case will press on, the outwardly extending portion of the insert piece. In this embodiment, the inwardly extending flange of the outer shell will pressure on the lower surface 40 of the upper rim flange 38 of the insert piece as shown in FIG. 2.

The inner circumferential surface 30 of the outer shell 24 also preferably slopes inwardly at an angle along a first surface 42 and then back outwardly at an angle along a second surface 44 which forms an angle $\beta_1$ (see, e.g., FIG. 3A) with the vertical as shown in cross section (see also FIG. 2) so that it operates to control the degree of movement and range of bending of the insert portion. The upper rim portion 34 of the outer shell 24 is preferably generally flat in a transverse plane along its upper surface so that it can engage a sink deck on installation. While the inwardly extending flange 32 and the upper rim flange 38 of the insert piece as demonstrated herein are generally flat in a transverse direction, it should be understood that both could also be angled or otherwise configured for engaging each other so that the insert piece operates to push the threads away and towards the threaded tailpiece, and that the embodiment shown herein, while preferred in this regard, is not intended to be limiting.

Figure 8:
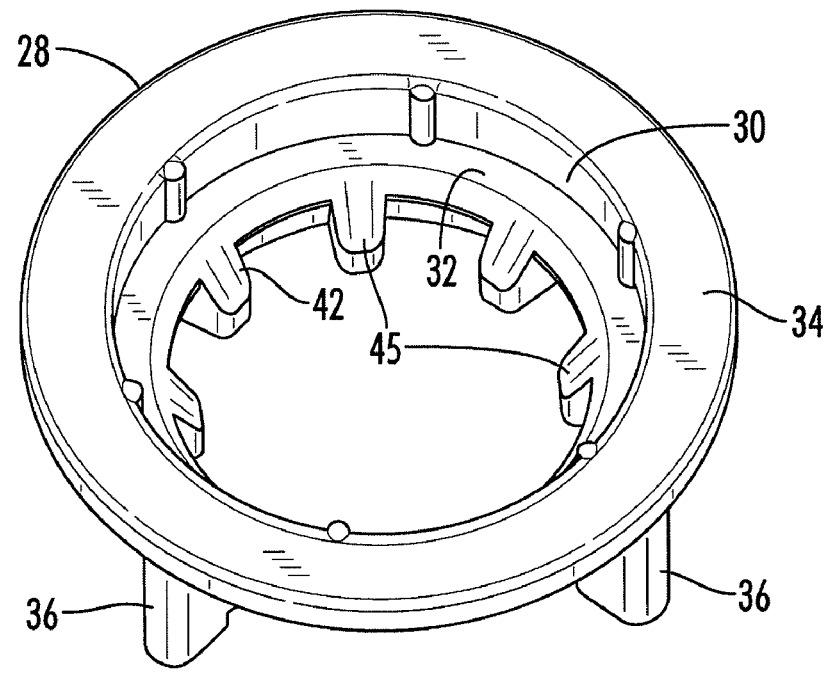
FIG. 8 is a top perspective view of a first piece of the push and turn nut of FIG. 1.

The fingers 45 as shown in FIG. 8 are located periodically on the periphery along with ribs 36 to fit in gaps between projections 46 discussed below thereby keeping them in place and enabling smoother turning so that the insert piece turns with the outer shell. The nut provides uniform application of torque and pressure to the threads when in use. The number of ribs and fingers may vary, while a preferred number are shown, it should be understood that you could have as few as two and as many as about 10 depending on size of the nut. For larger nuts, for use on larger nut-receiving surfaces, more ribs and fingers can be provided.

Figure 3A:
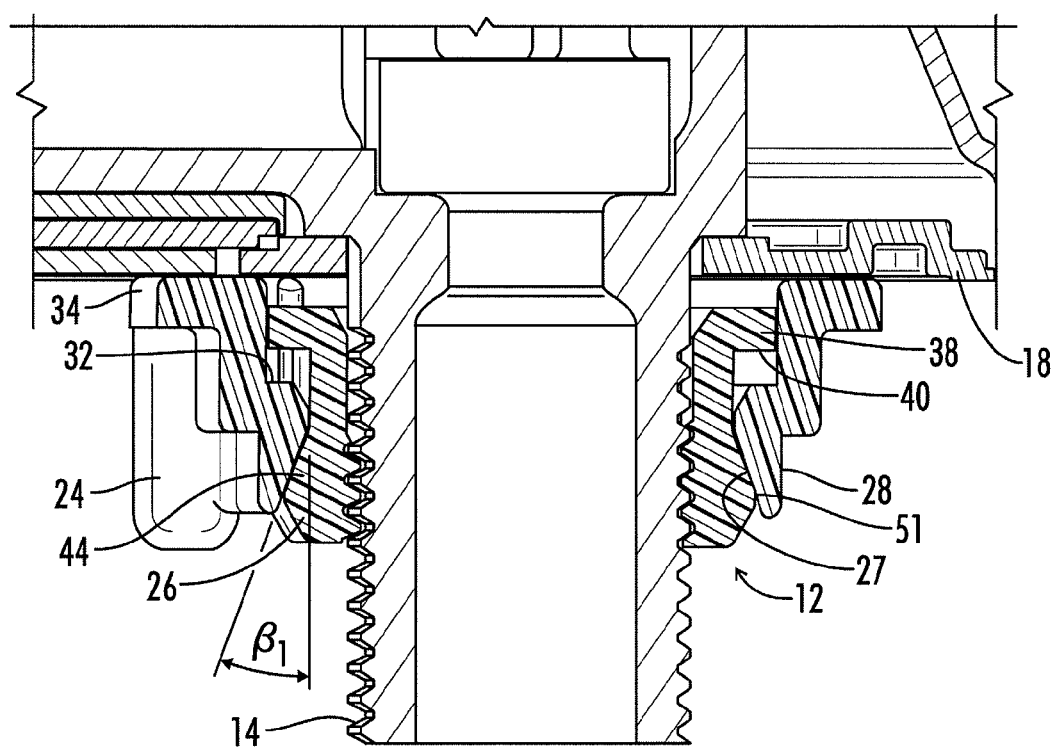
FIG. 3A is a longitudinal cross-section enlarged view of the push and turn nut of FIG. 3 at the upper end of the threaded faucet tailpiece.
Figure 9:
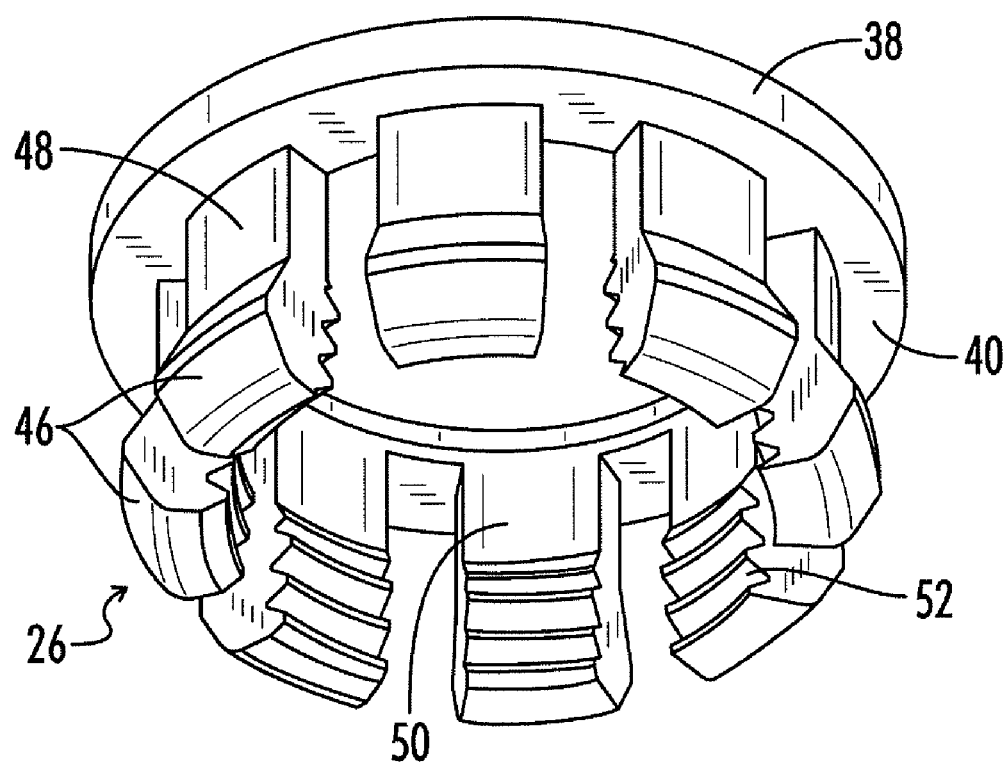
FIG. 9 is a bottom perspective view of a second piece of the push and turn nut of FIG. 1.
Figure 10:
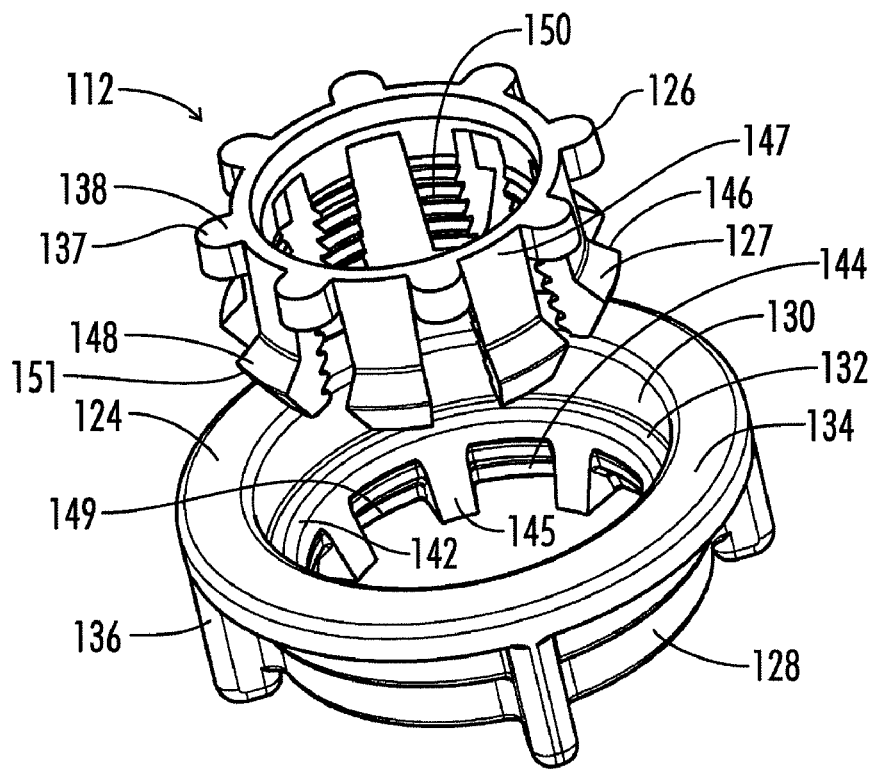
FIG. 10 is an exploded perspective view of a nut according to another embodiment of the invention.
Figure 11:
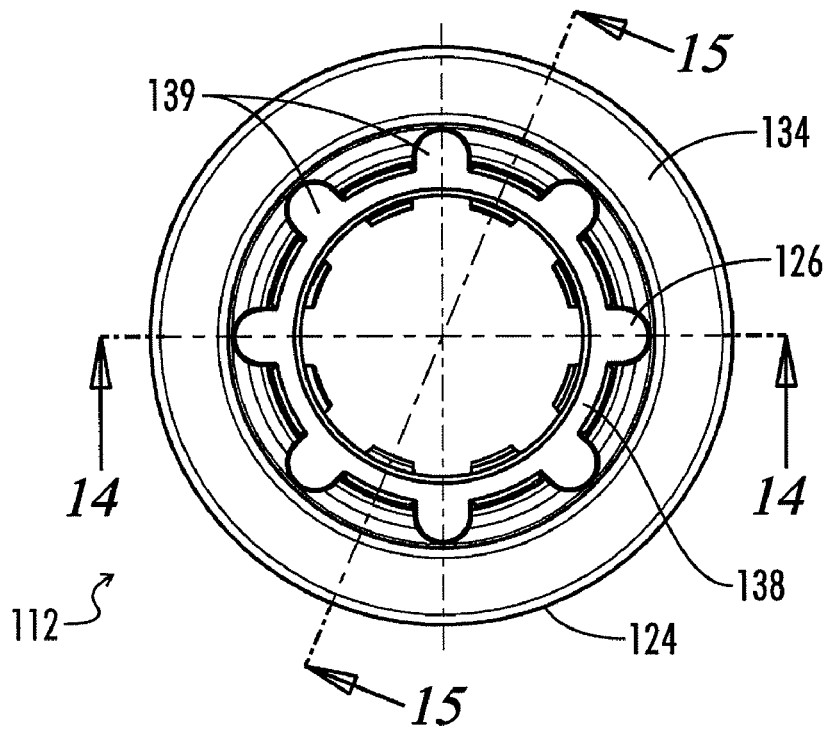
FIG. 11 is a top plan view of an assembled nut according to the embodiment of FIG. 10.

The insert piece 26 has an outwardly extending portion that is preferably in the form of an upper rim flange 38 as noted above and a plurality of downwardly extending projections 46 as best shown in FIG. 9. Each of such projections has an outer surface 48 configured to engage the inner circumferential surface of the outer shell. The outer surface 48 of the projections 46 has a downwardly and outwardly sloping surface, e.g., generally conically sloped surface 27 (see also FIG. 5). This surface 27 is of an angle $\beta_2$ with the vertical (see FIG. 2) similar to the angle formed by the generally conical surface 44 on the inner circumferential surface 30 of the outer shell 24 with the vertical, i.e., $\beta_1$ (as shown in FIG. 3A), so that when the two pieces are not engaged on a nut-receiving surface, they are at a slightly different angle with respect to each other, wherein typically $\beta_1 < \beta_2$. When engaged on a nut-receiving surface and tightened, the two surfaces 27, 44 contact each another and $\beta_1$ is approximately and preferably is equal to $\beta_2$.

The projections also each have an inner surface 50. A portion 52 of the inner surface 50 of each of the projections 46 is configured to engage a nut-receiving surface. In the present embodiment, the portion 52 is threaded. If threaded, the threading may be any standard threading, but is preferably formed to provide the optimal balance between clearance of the nut over the tailpiece or a bolt on which it is to engage, torque on tightening and force needed by the user. In one embodiment, herein the threads may be formed so as to be fully symmetrical along an axis A taken along the center of the thread in a transverse direction with the thread having an equal angle α on either side (see FIG. 5). For example, each surface of the thread may have an angle α on either side of the axis of about 10 degrees to about 75 degrees, preferably about 20 to about 50 degrees, and most preferably about 30 degrees. Alternatively, the threads may be asymmetrical if desired for further clearance over the tailpiece in sliding the nut before engaging the tailpiece threads. While threading is preferred as illustrated herein, the portion 52 may engage a nut receiving surface by other configurations as well, such as use of detents, or other interlocking portions. Preferably such a nut-receiving surface is designed and configured with the portion 52 to be interlocked one the nut is in place by turning.

The outer surface 48 of the projections is preferably configured to engage the inner circumferential surface 30 of the outer shell 24. That is, as shown, for example, in FIG. 2, the outer surface 48 of the insert piece and the projections 26 as well as the portion 52 of the inner surface of the projections preferably bend inwardly from the upper rim flange 38 of the insert piece and then extend generally downwardly. At the lower portion on the outer surface 48 of the projections, the surface preferably curves or slopes outwardly so as to engage the lower sloping surface 44 of the circumferential inner surface 30 of the outer shell 24 as described herein.

With reference to FIG. 3A, the opposing surfaces 27, 44 upon tightening, are such that the generally conical surfaces 27, 44 are generally mating surfaces. However, as noted above, when not tightened so that the nut can slide over a nut-receiving surface, the two surfaces 27, 44 are at an angle with respect to one another wherein typically $\beta_1 < \beta_2$. It is preferred in the present invention that there is a balance between a clamping force and a nut-receiving surface engagement force (which may be a thread engagement force when the engagement surfaces are threaded). The clamping force is the ability of the outer shell to push or clamp against the insert piece and push it towards the nut-receiving surface on engagement with the nut-receiving surface (i.e., how tight the nut is against the nut-receiving surface). The thread engagement force (or nut-receiving surface engagement force) is the force applied by the device pushing the nut-receiving engagement interior portion 52 of the insert piece against the engaging portion of the nut-receiving surface in a locking manner, for example, if the insert piece and the nut-receiving surface are threaded, it is the force pushing the threaded surfaces against one another when screwed in place. If these forces experience too much imbalance, it can impact the performance and results of the nut 12.

In use, such configuration helps to constrain the degree of movement on engagement between the insert piece and the outer shell in forcing the threads towards or away from the threaded tailpiece or the like. While this is one preferred design, it should be understood that the manner in which the two surfaces engage can be altered (e.g., a straight projection and corresponding detent and the like), provided that the inner circumferential surface of the outer shell is configured to engage the outer surface of the projections so that the threads are able to be moved away from or towards a bolt, tailpiece and the like while the nut slides over it or engages its threads respectively.

In operation, on a longitudinally upward pushing action of a user as the user pushes upwards on the outer shell, the lower surface of the rim flange 38 of the insert piece engages the inwardly extending flange 32 of the outer shell. By doing so, the upper portion of each of the projections bends slightly inwardly while the more flexible threaded lower portion moves outwardly. In doing so, there is still clearance and the top and the threads do not engage the bolt or tailpiece over which it will be slid (in this case, $\beta_1 < \beta_2$). This position can be seen best with reference to FIGS. 2, 4, 5 and 6. The user then slides the nut over the surface to position it at the uppermost portion of the threaded outer surface of the tailpiece. When the piece gets close, and turning starts, the projections 46 start to move toward the nut-receiving surface (in this case the tailpiece 14) (see FIG. 3) and the difference between angles $\beta_1$ and $\beta_2$ becomes smaller. Once the nut 12 is in place for tightening, pushing stops and the piece is tightened for locking so that it is fully engaged (at which point $\beta_1$ is approximately equal to and preferably equal to $\beta_2$). Upon removal of the pushing action, the insert piece 26 is preferably locked in place and the threads moved back inwardly so as to engage the threaded exterior of a bolt or tailpiece. The locking can occur by pushing upwards until an upper surface such as a deck approaches or engages the upper surface of the nut, or by simply having the user push up on the insert piece and/or down on the outer shell so that the upper rim flange of the insert piece no longer engages the inwardly extending flange of the outer shell. This is best seen in FIG. 3A. When this happens, the threads are no longer under pressure to bend outwardly and the portion of the inner surface configured to engage a nut-receiving surface, in this case the threaded inner surface of the projections, moves back inwardly locked into place by the outer shell so that the threads on the projections are able to engage the outer threaded portion of the tailpiece and tighten the nut.

The outer ribs 36 of the outer shell extend longitudinally and are preferably placed in opposed pairs at about two or three locations around the periphery of the outer shell. The longitudinally extending ribs provide a gripping place also for turning the nut. The outer shell and the insert piece are preferably two separate interlocking pieces as noted above, but it is contemplated that other pieces may be incorporated in the structure or the structure molded of a single flexible piece. It is also preferred that the outer shell and/or the insert piece is formed so as to incorporate in whole or in part a polymeric material. The polymeric materials used are preferably thermoplastic moldable materials such as various nylon, polycarbonate, polyacrylonitrile butadiene styrene (ABS), polyimide, polyetherimide, polysulfone, polyurethane, moldable fluoropolymers (FEP or PFA for example), polyolefinic polymers, and polysilicone materials which may be homopolymers, copolymers, interpolymers and the like. The polymers may be formed by any process and may be graft, random or block polymers. Reinforcing materials, such as glass or carbon fiber or powers, whisker, PTFE micropowder, talc, and other fillers and additives may be provided to strength the polymers, adjust their properties or provide desired frictional properties. In addition, metals or metal alloys, preferably in the case of the insert piece those having some flexibility, can be used as well, or a combination of polymer materials and metal pieces can be used.

The invention also includes an assembly including an apparatus 11 and a nut, such as faucet assembly 10 having faucet 11 and a nut as described hereinabove. The faucet assembly may include a faucet portion such as that shown in FIG. 1 having a base and at least one tailpiece, wherein the tailpiece is configured to extend downwardly below a deck of a sink on installation and has a threaded exterior surface also as shown in FIG. 1 and described above.

The faucet may be a kitchen faucet, a bathroom faucet, etc. Suitable tailpieces may be formed of a metal selected from copper, brass, lead or alloys thereof or other similar metals or may also be molded of a plastic material capable of adequately engaging the material the nut is formed from.

In a further embodiment of a nut according to the invention, referred to as nut 112 described herein, the nut may also be incorporated into a similar assembly(ies), as shown in FIGS. 10-15. The design of the nut 112 is similar to that shown in FIGS. 1-9, however, the outwardly extending portion 137 of the insert piece 126 is formed so as to not be a solid planar flange as in FIGS. 1-9, but instead to be a more broken design in which a plurality of extensions 139 extend in preferably the same transverse plane in areas between each of the downwardly extending projections 146. In addition, the inner surface 130 of the outer shell 124 is shaped at a slightly different angle from the embodiment of FIGS. 1-9 and includes a chamfered section 149 of the generally conical inner surface 130 of the outer shell.

In this embodiment, the extensions 139 provide the same effect in terms of the engagement of the insert piece 126 and the outer shell 124, but the gaps between the extensions which coincide with the locations of the downward projections 146 allow movement and ease of use in installation of the nut on a nut-receiving surface. As the outer shell and insert pieces are preferably interlocked when engaging a nut-receiving surface, the threads on the inert surface should be configured similarly to the embodiment noted above.

With respect to the embodiment of FIGS. 10-15, the interior surface 130 of the outer shell has surface 144 at an angle $\beta_1$ with respect to the vertical, which is slightly greater than the slope angle of interior sloped surface 44 in embodiment of FIGS. 1-9. In addition, a chamfered surface portion 149 is provided below the interior sloped surface 144. The sloped portion 127 of outer surface 148 of the downward projections 146 as seen in FIGS. 10-15 is also slightly more angled with respect to the vertical than the embodiment of FIGS. 1-9 providing a more pointed area 151 that is configured to be contacted by the chamfered surface portion 149. This design provides a more preferred balance between the clamping force and the nut-receiving engagement force (thread engagement force).

Figure 16:
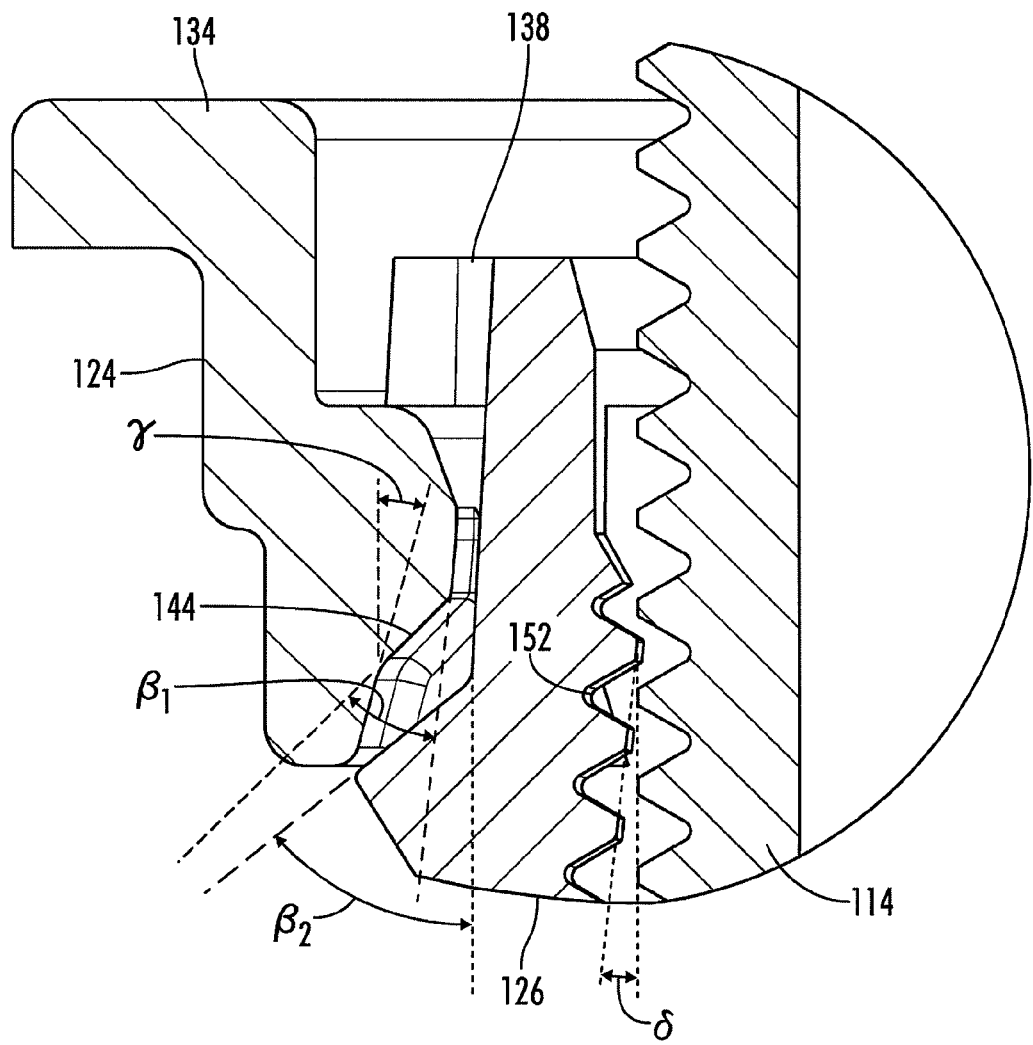
FIG. 16 is an enlarged cross-sectional view of a portion of a nut according to FIGS. 11-15 in a sliding, non-engaged position with respect to a nut-receiving surface.
Figure 17:
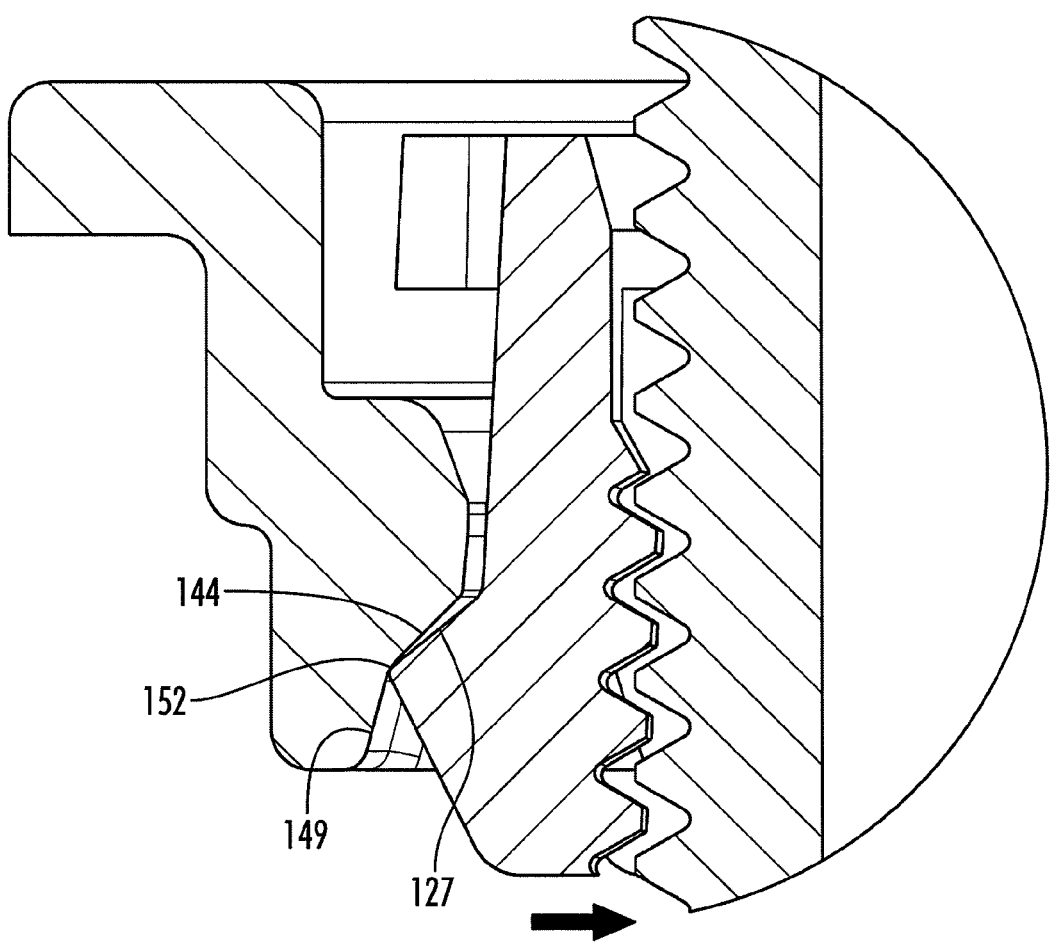
FIG. 17 is an enlarged cross-sectional view of a portion of a nut according to FIGS. 11-15 when partially engaged (after about 1 turn) on a nut-receiving surface.
Figure 18:
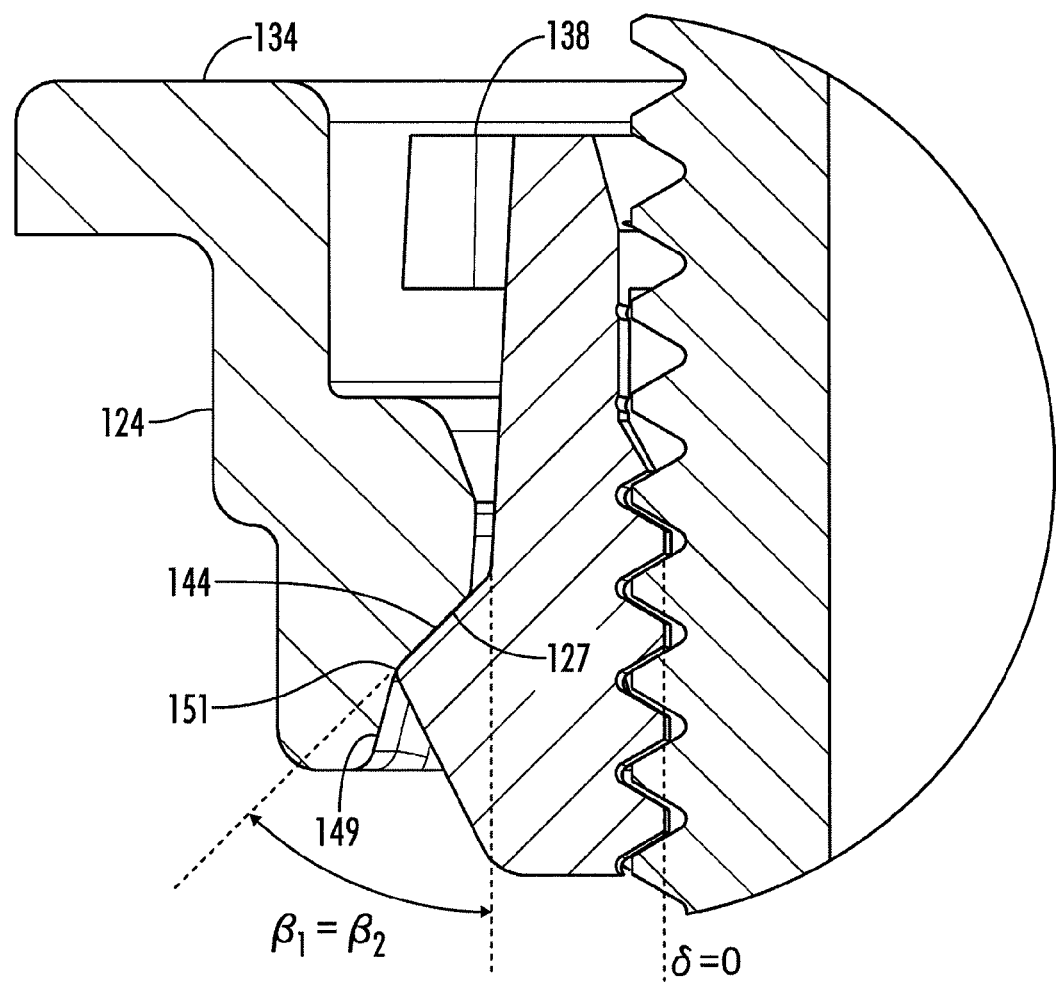
FIG. 18 is an enlarged cross-sectional view of a portion of a nut according to FIGS. 11-15 when fully engaged on a nut-receiving surface.

In the embodiments shown hereinabove, the operation of the angled surfaces are further described as best illustrated in FIGS. 16-18 (which is based on the embodiment of FIGS. 9-15, but the general information concerning the common angles applies to both embodiments), the angles $\beta_1$ (the angle of sloped surfaces 44, 144 on the outer shell) and $\beta_2$ (the angle of sloped surfaces 27, 127 on the insert piece) at full engagement (FIG. 18) are preferably between about 30 and about 60 degrees with the vertical, more preferably about 40 to about 50 degrees and most preferably about 45 degrees. When disengaged (FIG. 16), they may vary from one another with $\beta_1$ generally less than $\beta_2$ by about 1 to about 10 degrees, more preferably about 3 to about 8 degrees and most preferably about 6 degrees. That difference in angle begins to decrease (as in FIG. 17 where only one turn has been applied to the nut) as the nut begins to be tightened and the lower portion of the projections moves inwardly as shown by the arrow. The difference eventually approaches 0 (as in FIG. 18) as the nut finally becomes fully engaged with the nut-receiving surface. This is also approximately the same angle as the angle $\delta$ that the interior portion 52, 152 of the projections 46, 146 makes with the vertical as it moves from a disengaged or slidable configuration to a fully engaged or tightly threaded configuration (see angle $\delta$ in FIGS. 16 and 18).

With respect to the embodiment as shown in FIGS. 9-15, as best shown in FIGS. 16-18, wherein there is a chamfered portion having surface 149 that engages surface 127 and hugs the more pointed area 151, the chamfered portion surface 149 preferably forms an angle $\gamma$ with the vertical which is about 7 to about 25 degrees, more preferably about 10 to about 20 degrees, and most preferably about 15 degrees.

It will be understood based on this disclosure that the sizes, shapes, and angles $\alpha$, $\beta$, $\gamma$ and $\delta$ can be varied to alter the desired performance with respect to the balance between clamping and threaded engagement forces, as well as to fit varying sizes and shapes of nut-receiving surfaces, and also the materials of construction of the insert piece and the outer shell without departing from the spirit and scope of the invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A nut, comprising:
   an outer shell having an outer surface, an inner circumferential surface having a inwardly extending flange, an upper rim portion; and
   an insert piece having an upper, outwardly extending portion and a plurality of downwardly extending projections, wherein each of the projections has an outer surface and an inner surface, wherein a portion of the inner surfaces of each of the projections is configured to allow the nut to engage a nut-receiving surface and the outer surfaces of the projections are configured to engage the inner circumferential surface of the first outer shell such that upon a longitudinal upward pushing action of a user, the inwardly extending flange of the outer shell presses upwardly on the upper, outwardly extending portion of the insert piece so that the portions of the inner surfaces of the projections configured to engage a nut-receiving surface move outwardly and upon removal of the pushing action, the portions of the inner surfaces of the projections configured to engage a nut-receiving surface move back inwardly, and wherein the inner circumferential surface of the outer shell is configured to engage the outer surface of the projections so that the threads are able to be moved away from or towards a nut receiving surface.

2. The nut according to claim 1, wherein the upper outwardly extending portion of the insert piece is an upper rim flange.

3. The nut according to claim 1, wherein the upper outwardly extending portion of the insert piece comprises a plurality of extensions.

4. The nut according to claim 3, wherein each of the plurality of extensions has a rounded outer peripheral cross-sectional configuration.

5. The nut according to claim 1, wherein the portion of the inner surfaces of each of the projections on the insert piece configured to allow the nut to engage a nut-receiving surface has threads for mating engagement on a threaded nut-receiving surface.

6. The nut according to claim 5, wherein each of the threads is symmetrical.

7. The nut according to claim 5, wherein each of the threads forms an angle of about 30 degrees with a transverse axis through the thread.

8. The nut according to claim 1, wherein the outer shell and the insert piece are two separate interlocking pieces.

9. The nut according to claim 1, wherein the outer shell and/or the insert piece comprises a polymeric material.

10. The nut according to claim 9, wherein the polymeric material is a thermoplastic moldable material.

11. The assembly according to claim 10, wherein the assembly is a faucet assembly, and the apparatus is a faucet comprising a base and at least one tailpiece, wherein the nut-receiving surface is on the tailpiece.

12. The assembly according to claim 11, wherein the tailpiece is configured to extend downwardly below a deck of a sink on installation and the nut-receiving surface is a threaded exterior surface of the tailpiece.

13. The assembly according to claim 11, wherein the faucet is a kitchen faucet.

14. The assembly according to claim 11, wherein the faucet is a bathroom faucet.

15. The assembly according to claim 11, wherein the tailpiece comprises copper, brass, lead or alloys thereof.

16. The nut according to claim 1, wherein the outer shell and/or the insert piece comprises a metal or a metal alloy.

17. A nut, comprising:
an outer shell having an outer surface, an inner circumferential surface having a inwardly extending flange, an upper rim portion; and
an insert piece having an upper, outwardly extending portion and a plurality of downwardly extending projections, wherein each of the projections has an outer surface and an inner surface, wherein a portion of the inner surfaces of each of the projections is configured to allow the nut to engage a nut-receiving surface and the outer surfaces of the projections are configured to engage the inner circumferential surface of the first outer shell such that upon a longitudinal upward pushing action of a user, the inwardly extending flange of the outer shell presses upwardly on the upper, outwardly extending portion of the insert piece so that the portions of the inner surfaces of the projections configured to engage a nut-receiving surface move outwardly and upon removal of the pushing action, the portions of the inner surfaces of the projections configured to engage a nut-receiving surface move back inwardly, wherein the outer shell further comprises at least one pair of opposed ribs extending longitudinally downwardly from the rim portion.

18. A nut, comprising:
an outer shell having an outer surface, an inner circumferential surface having a inwardly extending flange, an upper rim portion; and
an insert piece having an upper, outwardly extending portion and a plurality of downwardly extending projections, wherein each of the projections has an outer surface and an inner surface, wherein a portion of the inner surfaces of each of the projections is configured to allow the nut to engage a nut-receiving surface and the outer surfaces of the projections are configured to engage the inner circumferential surface of the first outer shell such that upon a longitudinal upward pushing action of a user, the inwardly extending flange of the outer shell presses upwardly on the upper, outwardly extending portion of the insert piece so that the portions of the inner surfaces of the projections configured to engage a nut-receiving surface move outwardly and upon removal of the pushing action, the portions of the inner surfaces of the projections configured to engage a nut-receiving surface move back inwardly, wherein the inner circumferential surface of the outer shell comprises an outwardly sloped generally conical surface that engages a mating conical sloped surface on the outer surface of the projections when the nut is engaged against a nut-receiving surface.

19. The nut according to claim 18, wherein the inner circumferential surface of the outer shell further comprises a chamfered portion.

20. An assembly, comprising:
an apparatus having a nut receiving surface, and
a nut, comprising:
an outer shell having an outer surface, an inner circumferential surface having an inwardly extending flange, an upper rim portion; and
an insert piece having an upper outwardly extending portion and a plurality of downwardly extending projections, wherein each of the projections has an outer surface and an inner surface, wherein a portion of the inner surfaces of each of the projections is configured to allow the nut to engage the nut-receiving surface of the apparatus, and the outer surfaces of the projections are configured to engage the inner circumferential surface of the first outer shell such that upon a pushing action of a user, the inwardly extending flange on the outer shell presses upwardly on the upper, outwardly extending portion of the insert piece so that the portion of the inner surfaces of each of the projections configured to engage the nut-receiving surface move outwardly and upon removal of the pushing action, the portion of each of the inner surfaces of the projections configured to engage the nut-receiving surface move back inwardly so as to engage the nut-receiving surface on the apparatus.

21. The assembly according to claim 20, wherein the upper outwardly extending portion of the insert piece is an upper rim flange.

22. The assembly according to claim 20, wherein the upper outwardly extending portion of the insert piece comprises a plurality of extensions.

23. The assembly according to claim 20, wherein each of the plurality of extensions has a rounded outer peripheral cross-sectional configuration.

24. The assembly according to claim 20, wherein the portion of each of the inner surfaces of the projections on the insert piece which is configured to allow the nut to engage the nut-receiving surface has threads, and the nut-receiving surface has mating threads for mating engagement with the portion of the inner surfaces of the projections of the insert piece.

25. The assembly according to claim 24, wherein each of the threads on the nut is symmetrical.

26. The assembly according to claim 24, wherein each of the threads on the nut forms an angle of about 30 degrees with a transverse axis through the thread.

27. The assembly according to claim 20, wherein the outer shell further comprises at least one pair of opposed ribs extending longitudinally downwardly from the rim portion.

28. The assembly according to claim 20, wherein the outer shell and the insert piece are two separate interlocking pieces.

29. The assembly according to claim 20, wherein the inner circumferential surface of the outer shell of the nut comprises an outwardly sloped generally conical surface that engages a mating conical sloped surface on the outer surface of the projections when the nut is engaged against a nut-receiving surface.

30. The nut according to claim 29, wherein the inner circumferential surface of the outer shell of the nut further comprises a chamfered portion.

31. The assembly according to claim 20, wherein the outer shell and/or the insert piece comprises a polymeric material.

32. The assembly according to claim 31, wherein the polymeric material is a thermoplastic moldable material.

33. The assembly according to claim 20, wherein the outer shell and/or the insert piece comprises a metal or a metal alloy.

* * * * *